(12) United States Patent
Batinas-Geurts et al.

(10) Patent No.: US 9,587,047 B2
(45) Date of Patent: Mar. 7, 2017

(54) PROCESS FOR THE PRODUCTION OF BIMODAL POLYETHYLENE IN THE PRESENCE OF THIS CATALYST SYSTEM

(71) Applicant: Saudi Basic Industries Corporation, Riyadh (SA)

(72) Inventors: Aurora Alexandra Batinas-Geurts, Sittard (NL); Nicolaas Hendrika Friederichs, Brunssum (NL); Tom Schoffelen, Hulsberg (NL); Erik Zuidema, 's-Hertogenbosch (NL); Priya Garg, Vaals (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 53 days.

(21) Appl. No.: 14/364,675

(22) PCT Filed: Dec. 6, 2012

(86) PCT No.: PCT/EP2012/005031
§ 371 (c)(1),
(2) Date: Jun. 12, 2014

(87) PCT Pub. No.: WO2013/087167
PCT Pub. Date: Jun. 20, 2013

(65) Prior Publication Data
US 2014/0350200 A1    Nov. 27, 2014

(30) Foreign Application Priority Data

Dec. 12, 2011 (EP) ..................................... 11075268

(51) Int. Cl.
*C08F 110/02* (2006.01)
*C08F 210/16* (2006.01)

(52) U.S. Cl.
CPC .......... *C08F 110/02* (2013.01); *C08F 210/16* (2013.01)

(58) Field of Classification Search
CPC ............................ C08F 110/02; C08F 210/16
See application file for complete search history.

(56) References Cited

U.S. PATENT DOCUMENTS

| | | | |
|---|---|---|---|
| 4,178,300 A | 12/1979 | van den Berg | |
| 4,972,035 A | 11/1990 | Suga et al. | |
| 5,300,470 A | 4/1994 | Cuffiani et al. | |
| 6,294,682 B1 | 9/2001 | Rauleder et al. | |
| 7,989,549 B2 * | 8/2011 | Zhou | C08F 10/00 525/191 |
| 2014/0296454 A1 | 10/2014 | Batinas-Geurts et al. | |

FOREIGN PATENT DOCUMENTS

| | | |
|---|---|---|
| EP | 1273596 A1 | 1/2003 |
| JP | 04314708 A | 11/1992 |
| JP | 05255440 A | 10/1993 |
| JP | 09309921 A | 12/1997 |
| JP | H09309922 A | 12/1997 |
| JP | H11228635 A | 8/1999 |
| JP | 2003321583 A | 11/2003 |
| JP | 2004018697 A | 1/2004 |
| JP | 4314708 B2 | 8/2009 |
| JP | 5255440 B2 | 8/2013 |
| WO | 03106511 A1 | 12/2003 |
| WO | 2009112254 A1 | 9/2009 |
| WO | WO 2010006756 A1 * | 1/2010 ............ C08F 10/02 |
| WO | 2011144431 A1 | 11/2011 |

OTHER PUBLICATIONS

Machine translation of JP H05 255440 (original document provided by Applicant).*
Weber et al.; "Determination of the Titanium Oxidation States in a MgCl2-Supported Ziegler-Natta Catalyst (CW-Catalyst) During Aging and Polymerization"; Transition Metals and Organometallics as Catalysts for Olefin Polyermization; 1988; pp. 45-53.

(Continued)

*Primary Examiner* — Catherine S Branch
(74) *Attorney, Agent, or Firm* — Cantor Colburn LLP

(57) ABSTRACT

The invention relates to a process for the production of bimodal polyethylene in a two-step polymerization process in the presence of a catalyst system comprising: (I) the solid reaction product obtained by reacting of: a) a hydrocarbon solution containing 1) an organic oxygen containing magnesium compound or a halogen containing magnesium compound and 2) an organic oxygen containing titanium compound and b) an aluminum halogenide having the formula $AlR_nX_{3-n}$ in which R is a hydrocarbon radical containing 1-10 carbon atoms, X is halogen and $0<n<3$ (II) an aluminum compound having the formula $AlR_3$ in which R is a hydrocarbon radical containing 1-10 carbon atom and (III) an electron donor selected from the group of 1,2-dialkoxy-alkanes and 1,2-dialkoxyalkenes wherein in the first step a low molecular weight polyethylene is produced which has a $MFI_{190/1,2}$ is between 1 and 200 dg/min, and in the second step a high molecular weight ethylene copolymer is produced in which the $MFI_{190/5}$ of the total product is between 0.1 and 5 dg/min, and the weight fraction of the material produced in the first step is between 40 wt % and 60 wt % of the total product.

8 Claims, No Drawings

(56) References Cited

OTHER PUBLICATIONS

Alt et al.; "Bimodal Polyethylene—Interplay of Catalyst and Process"; Macromolecular Symposia; vol. 163, Issue 1; Jan. 2001; pp. 135-144.
Bent; "An Appraisal of Valence-Bond Structures and Hybridization in Compounds of the First-Row Elements"; Chemical Reviews; vol. 61, Issue 3; Jun. 1961; pp. 275-311.
Berzen et al.; "Ultrahigh Molecular Weight Polyethylene (UMHW-PE): Application in Artificial Joints"; The British Polymer Journal; vol. 10; Dec. 1978; 4 Pages.
Bromstrup; "PE 100 Pipe Systems"; Second Edition; ISBN 3-8027-2728-2; pp. 16-20.
Dall' Occo et al.; "Industrial Aspects of the Production of Catalysts for Ethylene Polymerization"; Transisition Metals and Organometallics as Catalysts; 1998; pp. 209-222.
Extended European Search Report; European Application No. 11075268.0; Date of Mailing Aug. 30, 2012; 8 Pages.
Fregonese et al.; "Ziegler-Natta MgCl2-Supported Catalysts: Relationship Between Titanium Oxidation States Distribution and Activity in Olefin Polymerization"; Journal of Molecular Catalysis A: Chemical; vol. 172, Issues 1-2; Jul. 5, 2001; pp. 89-95.
Garoff et al.; "Decrease in Activity Caused by Hydrogen in Ziegler-Natta Ethene Polymerisation"; European Polymer Journal; vol. 38, Issue 1; Jan. 2002; pp. 121-132.
Japanese Patent No. H11228635 (A); Publication Date: Aug. 24, 1999; Machine Translation; Document No. XP002682161; 15 Pages.
Kelly; "Ultra-High Molecular Weight Polyethylene"; Journal of Macromolecular Science Part C—Polymer Reviews; vol. C42, No. 3; 2002; pp. 355-371.
Kurelec et al.; "Strain Hardening Modulus as a Measure of Environmental Stress Crack Resistence of High Density Polyethylene"; Polymer; vol. 46, Issue 17; Aug. 8, 2005; pp. 6363-6379.
International Search Report; International Application No. PCT/EP2012/005031; International Filing Date: Dec. 6, 2012; Date of Mailing: Jun. 26, 2013; 4 Pages.
Stein; "Ultra High Molecular Weight Polyethylene (UHMWPE)"; Engineered Materials Handbook; vol. 2: Engineering Plastics; 1998; 7 Pages.
Written Opinion of the International Searching Authority for International Application No. PCT/EP2012/005031; International Filing Date: Dec. 6, 2012; Date of Mailing: Jun. 26, 2013.

\* cited by examiner

PROCESS FOR THE PRODUCTION OF BIMODAL POLYETHYLENE IN THE PRESENCE OF THIS CATALYST SYSTEM

CROSS REFERENCE TO RELATED APPLICATIONS

This application is a 371 of International Application No. PCT/EP2012/005031, filed Dec. 6, 2012, which claims priority to European Application No. 11075268.0, filed Dec. 12, 2011, both of which are hereby incorporated by reference in its entirety.

The present invention relates to a two-step polymerisation process for the production of bimodal polyethylene in the presence of a catalyst system.

The production processes for bimodal high density polyethylene (HDPE) are summarised at pages 16-20 of "PE 100 Pipe systems" (edited by Bromstrup; second edition, ISBN 3-8027-2728-2).

The production of bimodal high density polyethylene (HDPE) via a low pressure slurry process is described by F. P. Alt et al. in "Bimodal polyethylene-Interplay of catalyst and process" (Macromol. Symp. 2001, 163, 135-143). Bimodal high density polyethylene may be produced via a low pressure slurry process comprising a polymerisation stage, a powder drying stage, an extrusion and pellet handling stage, a recycling stage and a wax removal unit. In a two stage cascade process the reactors may be fed continuously with a mixture of monomers, hydrogen, catalyst/cocatalyst and hexane recycled from the process. In the reactors, polymerisation of ethylene occurs as an exothermic reaction at pressures in the range between for example 0.3 MPa (3 bar) and 2 MPa (20 bar) and at temperatures in the range between for example 70° C. and 90° C. The heat from the polymerisation reaction is removed by means of cooling water. The characteristics of the polyethylene are determined amongst others by the catalyst system and by the concentrations of catalyst, co monomer and hydrogen.

The concept of the two stage cascade process is elucidated at pages 137-138 by F. P. Alt et al. "Bimodal polyethylene-Interplay of catalyst and process" (Macromol. Symp. 2001, 163). The reactors are set up in cascade with different conditions in each reactor including a low hydrogen content in the second reactor. This allows for the production of HDPE with a bimodal molecular mass distribution and defined co monomer distribution in the polyethylene chains.

Suitable catalysts for the production of bimodal polyethylene include Ziegler catalysts, chromium based catalysts and single site metallocene catalysts. Currently, Ziegler catalysis is the main system of choice in most of today's processes. In all potential possible technologies the process and the catalyst have to form a well-balanced system. The catalyst is crucial for the polymerisation of bimodal polyethylene polymerisation reaction. By cooperation of process and catalyst a definite polymer structure is produced.

The staged production of bimodal HDPE requires that the catalyst is sufficiently sensitive to hydrogen in order to produce the low molecular weight polymer in the first stage whereas the same catalyst should also have sufficient capability to produce a very high molecular weight copolymer in the second stage.

Bimodal HDPE is applied in high performance applications like for example pressure pipes, blow moulded containers and high performance film. These applications typically are more demanding compared for instance stretch film applications. The concept of a bimodal polymer results in a high strength polymer that is suitable for such high performance applications whereas it still has sufficient processability to allow extrusion techniques for processing.

There is still a need for bimodal HDPE with improved strength as this allows the use of such material in more demanding applications or alternatively, allows thinner wall pipes or containers displaying similar strength as the current state of the art bimodal HDPE materials.

It is the object of the present invention to provide a process which results in bimodal HDPE with improved mechanical properties for example strain hardening and impact behaviour.

The process for the production of bimodal polyethylene according to the invention is a two-step polymerisation process in the presence of a catalyst system comprising (I) the solid reaction product obtained from the reaction of:
  a) a hydrocarbon solution containing
    1) an organic oxygen containing magnesium compound or a halogen containing magnesium compound and
    2) an organic oxygen containing titanium compound and
  b) an aluminium halogenide having the formula $AlR_nX_{3-n}$ in which R is a hydrocarbon radical containing 1-10 carbon atoms, X is halogen and $0<n<3$ (II) an aluminium compound having the formula $AlR_3$ in which R is a hydrocarbon radical containing 1-10 carbon atom and (III) an electron donor selected from the group of 1,2-dialkoxyalkanes and 1,2-dialkoxyalkenes wherein in the first step a low molecular weight polyethylene is produced which has a $MFI_{190/1.2}$ is between 1 and 200 dg/min, and in the second step a high molecular weight ethylene copolymer is produced in which the $MFI_{190/5}$ of the total product is between 0.1 and 5 dg/min, and the weight fraction of the material produced in the first step is between 40 wt % and 60 wt % of the total product.

The $MFI_{190/1.2}$ and $MFI_{190/5}$ of the resin are determined according to ASTM D1238, using a temperature of 190° C. under a load of 1.2 kg and 5 kg respectively.

According to a preferred embodiment of the invention the electron donor is a dialkoxy hydrocarbon compound represented by the formula (I):

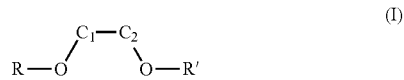

(I)

wherein $C_1$-$C_2$ is a connecting group consisting of 2 carbon atoms which are in the $sp^3$ and/or $sp^2$ hybridisation form and wherein the substituent's R and R' are hydrocarbon groups with 1-10 carbon atoms and may be the same or different and may optionally be substituted with other groups containing O, N, or Si.

The meaning of $sp^3$ and/or $sp^2$ hybridisation is known to the man skilled in the art and for example described by Henry Bent in Chem. Review, 1961 (3) pages 275-311.

According to a preferred embodiment of the invention the electron donor is selected from the group of 1,2-dialkoxyalkanes and 1,2-dialkoxyalkenes include 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane. More preferably 1-allyl-3,4-dimethoxybenzene is selected.

The electron donor can be dosed at different steps in and after the preparation of the solid catalytic complex. The electron donor may be added either during the preparation of the solid catalytic complex (at the same time as the subsequent step or in an additional step) or during the polymerization stage.

The electron donor may be added during the preparation of the solid catalytic complex, for instance by adding the electron donor before the addition of the aluminium halogenide (b) having the formula $AlR_nX_{3-n}$ in which R is a hydrocarbon radical containing 1-10 carbon atoms, X is halogen and $0<n<3$.

The electron donor may also be added after the preparation of the solid catalytic complex, so adding after the addition of the aluminium halogenide (b) having the formula $AlR_nX_{3-n}$ in which R is a hydrocarbon radical containing 1-10 carbon atoms, X is halogen and $0<n<3$.

Furthermore the electron donor may be added after the preparation of the solid catalytic complex and after subsequent washing of the solid catalytic complex.

The electron donor may also be added separately from the catalysts to the polymerisation reactor.

Preferably the electron donor is added to the solid catalytic complex.

The electron donor may be added in the pure state to the liquid complex or in the form of a solution in a solvent such as liquid aliphatic, cycloaliphatic and aromatic hydrocarbons. Preferred solvents include hydrocarbons containing up to 20 carbon atoms, and in particular linear alkanes (for example propane, n-butane, n-hexane and n-heptane) or branched alkanes (for example isobutane, isopentane and isooctane) or cycloalkanes (for example cyclopentane and cyclohexane). Good results are obtained with linear or branched alkanes.

The process for preparing the catalyst may comprise the reaction of

I. the solid reaction product by reacting:
 a) a hydrocarbon solution containing
   1. an organic oxygen containing magnesium compound or a halogen containing magnesium compound and
   2. an organic oxygen containing titanium compound and
 b) an aluminium halogenide having the formula $AlR_nX_{3-n}$ in which R is a hydrocarbon radical containing 1-10 carbon atoms, X is halogen and $0<n<3$ and combining the reaction product from (I) with II. an aluminium compound having the formula $AlR_3$ in which R is a hydrocarbon radical containing 1-10 carbon atom wherein the electron donor selected from the group of 1,2-dialkoxyalkanes and 1,2-dialkoxyalkenes is added during the preparation of the solid catalytic complex or after the preparation after the addition of the aluminium halogenide (b).

During the reaction of the hydrocarbon solution comprising the organic oxygen containing magnesium compound and the organic oxygen containing titanium compound with component (I b) a solid catalyst precursor precipitates and after the precipitation reaction the resulting mixture is heated and refluxed to finish the reaction.

The amount of electron donor used is at least 0.01 mol electron donor per mole of titanium and preferably this amount is at least 0.02 mol. More preferably the amount of electron donor is at least 0.05 mol per mole of transition metal. Generally the amount of electron donor does not exceed 50 mol per mole of transition metal used. Preferably this amount does not exceed 25 mol/mol. According to a preferred embodiment of the invention values the amount of electron donor is less than 10 mol/mol. According to a further preferred embodiment of the invention values the amount of electron donor ranges between 0.1 and 10 mol per mol transition metal.

The aluminium compound (II) is dosed prior to or during the polymerization and may be referred to as a cocatalyst.

Suitable organic oxygen containing magnesium compounds include for example magnesium alkoxides such as magnesium methylate, magnesium ethylate and magnesium isopropylate and alkylalkoxides such as magnesium ethylethylate and so called carbonized magnesiumalkoxide such as magnesium ethyl carbonate.

Preferably, the organic oxygen containing magnesium compound is a magnesium alkoxide.

Preferably the magnesium alkoxide is magnesium ethoxide $Mg(OC_2H_5)_2$.

Suitable halogen containing magnesium compounds include for example magnesium dihalides and magnesium dihalide complexes wherein the halide is preferably chlorine.

Preferably the hydrocarbon solution comprises an organic oxygen containing magnesium compound as (I) (a) (1).

Suitable organic oxygen containing titanium compound may be represented by the general formula $[TiO_x(OR)_{4-2x}]_n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates. Preferably the organic oxygen containing titanium compounds is a titanium alkoxide.

Suitable alkoxides include for example Ti $(OC_2H_5)_4$, Ti $(OC_3H_7)_4$, TiOC$_4$H$_9)_4$ and Ti$(OC_8H_{17})_4$. Preferably the organic oxygen containing titanium compound is Ti $(OC_4H_9)_4$.

Preferably the aluminium halogenide is a compound having the formula $AlR_nX_{3-n}$ in which R is a hydrocarbon radical containing 1-10 carbon atoms, X is halogen and $1.5<n<3$.

Suitable examples of the aluminium halogenide in (I) b having the formula $AlR_nX_{3-n}$ include aluminium tri chloride, ethyl aluminium dibromide, ethyl aluminium dichloride, propyl aluminium dichloride, n-butyl aluminium dichloride, iso butyl aluminium dichloride, diethyl aluminium chloride, diisobutyl aluminium chloride, triisobutyl aluminium and tri-n-hexyl aluminium. Preferably X is Cl.

Preferably the organo aluminium halogenide in (I) b) is an organo aluminium chloride, more preferably ethyl aluminium dichloride.

Suitable examples of the cocatalyst of the formula $AlR_3$ include tri ethyl aluminium, tri isobutyl aluminium, tri-n-hexyl aluminium and tri octyl aluminium. Preferably the aluminium compound in (II) of the formula $AlR_3$ is tri ethyl aluminium or tri isobutyl aluminium.

The hydrocarbon solution of organic oxygen containing magnesium compound and organic oxygen containing titanium compound can be prepared according to procedures as disclosed for example in U.S. Pat. No. 4,178,300 and EP0876318. The solutions are in general clear liquids. In case there are any solid particles, these can be removed via filtration prior to the use of the solution in the catalyst synthesis.

Generally the molar ratio of aluminium from (b): titanium from (a) is higher than 3:1 and preferably this ratio is higher than 5:1.

Generally the molar ratio of magnesium:titanium is lower than 3:1 and preferably the molar ratio magnesium:titanium ranges between 0, 2:1 and 3:1.

Generally the molar ratio of aluminium from (II): titanium from (a) ranges between 1:1 and 300:1 and preferably the molar ratio of aluminium from (II): titanium from (a) ranges between 3:1 and 100:1.

The catalyst may be obtained by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and the organo aluminium halogenide having the formula $AlR_nX_{3-n}$ and the electron donor may be added either during the preparation of the solid catalytic complex (at the same time as the subsequent step or in an additional step) or at the polymerization stage.

Generally, the aluminium halogenide having the formula $AlR_nX_{3-n}$ is used as a solution in a hydrocarbon. Any hydrocarbon that does not react with the organo aluminium halogenide is suitable to be applied as the hydrocarbon.

The sequence of the addition can be either adding the hydrocarbon solution containing the organic oxygen containing magnesium compound and organic oxygen containing titanium compound to the compound having the formula $AlR_nX_{3-n}$ or the reversed.

The temperature for this reaction can be any temperature below the boiling point of the used hydrocarbon. Generally the duration of the addition is preferably shorter than 1 hour.

In the reaction of the hydrocarbon solution of the organic oxygen containing magnesium compound and the organic oxygen containing titanium compound with the organo aluminium halogenide of formula $AlR_nX_{3-n}$, the solid catalyst precursor precipitates. After the precipitation reaction the resulting mixture is heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

The invention also relates to a process for the production of bimodal polyethylene wherein the polymerisation takes place in the presence of a catalyst as described in the foregoing or a catalyst obtained with the process as described in the foregoing wherein the electron donor is added during any of the synthetic steps in the preparation of the solid reaction product or during the use of the catalyst in the polymerisation.

The polymerization can be carried out in the presence of an anti-static agent or anti fouling agent in an amount ranging between for example 1 and 500 ppm related to the total amount of reactor contents.

JP05-255440 discloses a method for producing ethylene polymer via a three stage polymerization process with use of a catalyst system comprising a solid catalyst component, an organo aluminum compound and an electron donor. The limiting viscosity of the polymer produced in the respective steps, the ratio of the polymer relative to the total amount, and the ratio of α-olefin units in the polymer other than ethylene are restricted to specific ranges. JP05-255440 teaches a first stage polymerization producing a high molecular weight polymer having a limiting viscosity [η] range between 7 dL/g and 20 dL/g, in a relative amount between 10 and 20 wt % of the total polymer and containing between 0 and 10 wt % comonomer. The second stage polymerization producing a lower molecular weight polymer having a limiting viscosity range between 0.5 dL/g and 1.5 dL/g and containing between 0 and 5 wt % comonomer is followed by the third stage polymerization having a limiting viscosity range between 0.5 dL/g and 1.5 dL/g and containing between 0 and 5 wt % comonomer, where the relative amount of the polymers from the second and third stage is between 80 and 90 wt % of the total polymer. The catalyst contains a solid catalyst containing a magnesium alkoxide compound, a titanium compound and an aluminum halide, plus an organoaluminum compounds and an electron donor compound.

JP05-255440 clearly demonstrates that by using said catalyst, it is necessary to produce a high molecular weight product in the first stage, followed by lower molecular weight products in the second and third stage. Decreasing the molecular weight in the first stage leads to inferior mechanical properties.

The present invention will be elucidated by means of the following non-restrictive examples.

EXAMPLES

The solids content in the catalyst suspension was determined in triplo by drying 10 ml of a catalyst suspension under a stream of nitrogen, followed by evacuating for 1 hour and subsequently weighing the obtained amount of dry catalyst.

The density of the polymers is measured according to ISO1183

The melt-indices $MFI_{190/1.2}$, $MFI_{190/5}$ and $MFI_{190/21.6}$ are measured according to method ASTM D-1238 under a load of respectively 1.2 kg, 5 kg and 21.6 kg at 190° C.

The Flow rate ratio or FRR (21.6/5) is calculated as $MFR_{190/21.6}/MFI_{190/5}$ and is indicative for the rheological broadness of the material.

The split of the bimodal polymer is defined as the weight fraction of the low molecular weight material in the overall polymer. For the semi-batch process as described in the following polymerization examples, this translates into the cumulative ethylene consumption from the first polymerization step compared to the cumulative ethylene consumption in the combined first and second step.

The elemental compositions of the catalysts were analysed using Neutron Activation Analysis.

The alkoxide content as well as the donor content in the final catalyst was determined by GC analysis of a water-quenched catalyst sample.

The oxidation state of the catalyst was determined via oxidative titration with ferric sulphate following procedures as published by Garof, T.; Johansson, S.; Pesonen, K.; Waldvogel, P.; Lindgren, D. European Polymer Journal 2002, 38, 121; and Weber, S.; Chiem, J. C. W.; Hu, Y. Transition Met. Organomet. Catal. Olefin Polym. 1988, p 45-53; and Fregonese, D.; Mortara, S.; Bresadola, S. J. Mol. Cat A: Chem. 2001, 172, 89.

GPC analysis on the polymers was performed at 160° C. using 1,2,4-trichlorobenzene as the eluent.

The resistance to so called slow crack growth was measured using the strain hardening method, based on the publication by Kurelec, L. et al in Polymer 2005, 46, p 6369-6379

The Charpy impact measurement was measured at −30° C. following ISO 179.

Experiment I

Preparation of a Hydrocarbon Solution Comprising the Organic Oxygen Containing Magnesium Compound and the Organic Oxygen Containing Titanium Compound 100 grams of granular $Mg(OC_2H_5)_2$ and 150 milliliters of $Ti(OC_4H_9)_4$ were brought in a 2 liter round bottomed flask equipped with a reflux condenser and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Experiment II

Preparation of the Unmodified Catalyst

In a 0.8 liters glass reactor, equipped with baffles, reflux condenser and stirrer, 424 ml hexanes and 160 ml of the complex from Experiment I were dosed. The stirrer was set at 1200 RPM. In a separate Schlenk vessel, 100 ml of 50% ethyl aluminum dichloride (EADC) solution was added to 55 mL of hexanes. The resulting EADC solution was dosed into the reactor in 15 minutes using a peristaltic pump. Subsequently, the mixture was refluxed for 2 hours. After cooling down to ambient temperature, the obtained red/brown suspension was transferred to a glass P4 filter and the solids were separated. The solids were washed 3 times using 500 ml of hexanes. The solids were taken up in 0.5 L of hexanes and the resulting slurry was stored under nitrogen. The solid content was 64 g ml$^{-1}$ Catalyst Analysis Results:
Ti 10.8 wt %; Mg 11.2 wt %; Al 5.0 wt %; Cl 65 wt %; OEt 3.2 wt % and OBu 2.6 wt %.

The oxidation state of the catalyst was measured and it appeared that 98% of the overall titanium was Titanium (III). This proves that the Titanium is essentially in the trivalent oxidation state.

Experiment III

Methyl Eugenol (ME) Containing Catalyst

A 50.0 ml sample was taken from the slurry prepared in Experiment II and transferred to a 250 ml three-necked round bottom flask equipped with a nitrogen inlet and mechanical stirrer. 100 ml of hexanes were added. While stirring, 0.62 ml of methyl eugenol (1-allyl-3,4-dimethoxybenzene) was added drop wise. The mixture was stirred at room temperature for one hour, and then transferred to a P4 frit under nitrogen. The slurry was filtered and washed 3 times using 200 ml of fresh hexanes. The solids were taken up in 0.2 L of hexanes and the resulting slurry was stored under nitrogen.

Catalyst Analysis:
Ti 10.3 wt %; Mg 10.7 wt %; Al 2.1 wt %; Cl 57 wt %; Methyl eugenol 10.3 wt %; OEt 1.9 wt % and OBu 2.2 wt %.

Comparative Example A

Tetrahydrofuran (THF) Containing Catalyst

The tetrahydrofuran containing catalyst was prepared according to Example I, except that 0.59 ml of tetrahydrofuran was used instead of methyl eugenol.

Catalyst Analysis:
Ti 10.6 wt %; Mg 11.3 wt %; Al 1.5 wt %; Cl 59 wt %; Tetrahydrofuran 13.0 wt %; OEt 1.7 wt % and OBu 2.0 wt %.

Comparative Example B

Ethyl Benzoate (EB) Containing Catalyst

The ethyl benzoate containing catalyst was prepared according to Example I, except that 1.04 ml of ethyl benzoate was used instead of methyl eugenol.

Catalyst Analysis:
Ti 9.1 wt %; Mg 10.1 wt %; Al 1.4 wt %; Cl 52 wt %; Ethyl benzoate 23.6 wt %; OEt 1.7 wt % and OBu 2.0 wt %.

Examples I and Comparative Examples C-E

The controlling of the $MFI_{190/1.2}$ of the low molecular weight polymer under the first step conditions of the two step polymerization process.

The polymerization was performed in a 20 liters autoclave using 10 liters purified hexanes as a diluent. 8 Mmols of tri-isobutylaluminum were added to the 10 liters purified hexanes. In the first stage of the polymerization reaction the mixture was heated to 85° C. and pressurized with 1.2 bars ethylene and a hydrogen to ethylene headspace ratio ($H_2/C_2$) in the range of 4-5.6 v/v. Subsequently a slurry containing a known amount of the prepared catalyst of Experiment II, Experiment III, Comparative Example A or Comparative Example B was dosed. The temperature was maintained at 85° C. and the pressure was kept constant by feeding ethylene. The ethylene uptake is monitored to calculate the weight of polymer produced during the polymerisation. The hydrogen to ethylene ratio in the headspace was measured via online-GC and hydrogen was fed to maintain the ratio constant at the desired level. The polymerization reaction was stopped after 180 minutes. Stopping was performed by de-pressurizing and cooling down the reactor contents. The reactor contents were passed through a filter; the polymer powder was collected and subsequently dried. The results using the different catalysts are summarized in Table 1.

TABLE 1

Determining settings for first stage low molecular weight polymer

| Example | Catalyst | $H_2/C_2$ [v/v] | Catalyst amount [mg] | Catalyst Yield [kg/g] | $MFI_{190/1.2}$ [dg/min] |
|---|---|---|---|---|---|
| C | Exp II | 4.5 | 30 | 10.4 | 142 |
|   |        | 4.5 | 40 | 11.5 | 130 |
| II | Exp III | 5.6 | 60 | 6.3 | 130 |
|   |         | 5.6 | 75 | 3.7 | 107 |
| D | Comp A | 4.5 | 60 | 8.2 | 220 |
|   |        | 4.0 | 40 | 9.3 | 115 |
| E | Comp B | 4.5 | 60 | 6.9 | 77 |
|   |        | 5.6 | 50 | 6.8 | 153 |

Comparative Example F

Preparation of Bimodal PE Using a Two-Step Batch Polymerization

The polymerization was carried out in a 20 liters autoclave using 10 liters purified hexanes as a diluent. 8 Mmols of tri-isobutylaluminum were added to the 10 liters purified hexanes. In the first stage of the polymerization reaction the mixture was heated to 85° C. and pressurized with 1.2 bars ethylene and a hydrogen to ethylene ratio of 4.5 v/v. Subsequently a slurry containing 40 mg of the catalyst obtained in Experiment II was dosed. The temperature was maintained at 85° C. and the pressure was kept constant by feeding ethylene. The ethylene uptake is monitored to calculate the weight of polymer produced during the polymerisation. The hydrogen to ethylene ratio in the headspace was measured via online-GC and hydrogen was fed to maintain this ratio constant at 4.5 v/v. The first phase of the reaction was stopped after 180 minutes. Stopping was performed by de-pressurizing and cooling down the reactor contents. The second stage of the reactor is started by adding comonomer to the reactor subsequently raising the temperature to 80° C. and pressurizing the reactor with ethylene and hydrogen. The set partial pressure of ethylene in the second phase is 1.7 bar and the ratios for hydrogen to ethylene and 1-butene to ethylene are respectively 0.025 and 0.11 v/v. Again the ethylene uptake was monitored to calculate the amount of polymer produced in the second stage. The reaction was stopped when a split of 51 had been reached. Split is defined as the weight fraction of the first reactor product compared to the total product, which is calculated from the ethylene uptakes during the respective phases. Stopping was performed by de-pressurizing and cooling down the reactor. The reactor contents were passed through a filter; the polymer powder was collected and subsequently dried.

An amount of 756 grams of bimodal HDPE powder was produced.

The polymer powder had the following characteristics
a density of 948 kg/m$^3$
a MFI$_{190/5}$ of 0.24 dg/min and
a FRR (21.6/5) of 29.

Example II

Polymerization Bimodal HDPE Using the Catalyst of Experiment III

The polymerization was carried out similarly to the procedure as described in Comparative Example F with the exceptions that 75 mg of the catalyst as prepared in Experiment III was added to the reactor, and using a hydrogen to ethylene ratio in the first stage of 5.5 and in the second stage a hydrogen to ethylene and 1-butene to ethylene ratio of respectively 0.065 and 0.11.

801 grams of bimodal HDPE powder was produced.
The polymer powder had the following characteristics:
a density of 947 kg/m$^3$
a MFI$_{190/5}$ of 0.21 dg/min and
a FRR (21.6/5) of 24.

Comparative Example G

Polymerization Bimodal HDPE Using the Catalyst of Comparative Example A

The polymerization was carried out similarly to the procedure as described in Example II, with the exception that the catalyst as prepared in Comparative Example A was added to the reactor, and a hydrogen to ethylene ratio in the first stage of 4 and in the second stage a hydrogen to ethylene and 1-butene to ethylene ratio of respectively 0.025 and 0.10 were used.

901 grams of bimodal HDPE powder was produced.
The polymer powder had the following characteristics:
a density of 948 kg/m$^3$
a MFI$_{190/5}$ of 0.21 dg/min and
a FRR (21.6/5) of 34.

Comparative Example H

Polymerization Bimodal HDPE Using the Catalyst of Comparative Example B

The polymerization was carried out similarly to the procedure as described in Example II, with the exception that 50 mg of the catalyst as prepared in Comparative Example B was added to the reactor, and a hydrogen to ethylene ratio in the first stage of 5.5 and in the second stage a hydrogen to ethylene and 1-butene to ethylene ratio of respectively 0.01 and 0.08 were applied.

1057 grams of bimodal HDPE powder was produced.
The polymer powder had the following characteristics:
a density of 948 kg/m$^3$
a MFI$_{190/5}$ of 0.27 dg/min and
a FRR (21.6/5) of 34.

The bimodal HDPE polymers obtained in the previous examples have been analysed by GPC. The results are summarized in Table 2.

TABLE 2

GPC analysis of bimodal polymers

| Example | Donor | $M_n$* (kg/mol) | $M_w$* (kg/mol) | $M_z$* (kg/mol) | $M_w$*/$M_n$* (-) |
|---|---|---|---|---|---|
| F | — | 9.3 | 280 | 1400 | 30.4 |
| II | ME | 9.6 | 280 | 1300 | 29.0 |
| G | THF | 10 | 300 | 1600 | 30.0 |
| H | EB | 9.2 | 280 | 1500 | 30.9 |

As can be seen from these data, according to the applied GPC method the overall molar distribution of the bimodal products is very comparable for all donors.

The formation of ethane as a by-product with Ziegler catalysts in the presence of hydrogen is known to anyone skilled in the art. From all the first steps in the above described polymerizations, the total amount of ethane as produced during this first step, having high hydrogen to ethylene ratio, has been measured using the on-line gas chromatograph. The results are summarized in Table 3.

TABLE 3 total ethane production during the first step in bimodal HDPE preparation.

| Catalyst Example | Donor | Polymerization Example | g ethane/kg PE |
|---|---|---|---|
| Experiment II | — | E | 7.7 |
| Experiment III | ME | III | 5.4 |
| Comp A | THF | F | 8.7 |
| Comp B | EB | G | 8.5 |

As can be seen, the ME donor results in significantly lower ethane formation which contributes favorably to the overall economy of a bimodal process. Both the EB and THF donor result in even increased ethane production compared to the unmodified catalyst.

The obtained polymers have been analysed on the mechanical properties strain hardening and impact behaviour. The results are summarized in Table 4.

TABLE 4

| Catalyst Example | Polymerization Example | Strain hardening MPa | Charpy −30° C. KJ/m$^2$ |
|---|---|---|---|
| Experiment II | E | 55 | 11 |
| Experiment III | II | 60 | 13 |
| Comp A | F | 56 | 12 |
| Comp B | G | 55 | 10 |

From these results it is clear that the bimodal polymer prepared using the ethyl benzoate modified catalysts has the worst mechanical properties. The ME modified catalyst results in the best mechanical properties of all evaluated products. It is also clear that the two stage polymerization process, wherein a low molecular weight polymer is produced in the first stage, results in enhanced mechanical properties when using the catalyst system according to the current invention.

The invention claimed is:

1. A two-step polymerisation process for the production of bimodal polyethylene in the presence of a catalyst system comprising:
   (I) the solid reaction product obtained by reacting
      a) a hydrocarbon solution containing
         1) an organic oxygen containing magnesium compound or a halogen containing magnesium compound and
         2) an organic oxygen containing titanium compound wherein the molar ratio of magnesium to titanium is lower than 3:1, and
      b) an aluminium halogenide having the formula $AlR_nX_{3-n}$ in which R is a hydrocarbon radical containing 1-10 carbon atoms, X is halogen and $0<n<3$
   (II) an aluminium compound having the formula $AlR_3$ in which R is a hydrocarbon radical containing 1-10 carbon atom and
   (III) an electron donor selected from the group of 1,2-dialkoxyalkanes and 1,2-dialkoxyalkenes wherein in a first step a low molecular weight polyethylene is produced which has a $MFI_{190/1.2}$ between 1 and 200 dg/min, and in a second step a high molecular weight ethylene copolymer is produced in which a $MFI_{190/5}$ of a total product is between 0.1 and 5 dg/min, and a weight fraction of the low molecular weight polyethylene produced in the first step is between 40 wt % and 60 wt % of the total product.

2. The process according to claim 1, wherein the electron donor is a dialkoxy hydrocarbon compound represented by the formula (I):

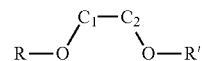

wherein $C_1$-$C_2$ is a connecting group consisting of 2 carbon atoms which are in a sp$^3$ and/or sp$^2$ hybridisation form and wherein the substituent's R and R' are hydrocarbon groups with 1-10 carbon atoms and may be the same or different and may optionally be substituted with other groups containing O, N, or Si.

3. The process according to claim 2, wherein the electron donor is 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane and/or 2,3-dimethoxybutane.

4. The process according to claim 3, wherein the electron donor is 1-allyl-3,4-dimethoxybenzene.

5. The process according to claim 1, wherein the electron donor is added separately from the solid reaction product and the aluminium compound to a polymerisation reactor.

6. The process according to claim 2, wherein the electron donor is added separately from the solid reaction product and the aluminium compound to a polymerisation reactor.

7. The process according to claim 3, wherein the electron donor is added separately from the solid reaction product and the aluminium compound to a polymerisation reactor.

8. The process according to claim 4, wherein the electron donor is added separately from the solid reaction product and the aluminium compound to a polymerisation reactor.

* * * * *